(12) United States Patent
Stek et al.

(10) Patent No.: US 7,401,001 B2
(45) Date of Patent: Jul. 15, 2008

(54) POSITION DETERMINING

(75) Inventors: Aalbert Stek, Eindhoven (NL); Anthonius Petrus Gerardus Emanuel Janssen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/579,418

(22) PCT Filed: Nov. 12, 2004

(86) PCT No.: PCT/IB2004/052410
§ 371 (c)(1),
(2), (4) Date: May 15, 2006

(87) PCT Pub. No.: WO2005/050140
PCT Pub. Date: Jun. 2, 2005

(65) Prior Publication Data
US 2007/0093980 A1 Apr. 26, 2007

(30) Foreign Application Priority Data
Nov. 18, 2003 (EP) .................................. 03104243

(51) Int. Cl.
*G06F 19/00* (2006.01)

(52) U.S. Cl. ..................... 702/150; 702/94; 702/112; 702/113; 702/145; 73/865.9; 324/76.13; 324/207.12; 341/8; 341/115

(58) Field of Classification Search ............... 702/150, 702/109–113, 116, 142–147, 151–153, 163, 702/94; 73/865.9; 324/207.25, 207.2, 76.12, 324/76.14, 207.12, 207.14, 76.13; 341/8, 341/115
See application file for complete search history.

(56) References Cited

U.S. PATENT DOCUMENTS

| 4,634,949 | A |   | 1/1987  | Golladay |
| 5,610,683 | A |   | 3/1997  | Takahashi |
| 5,663,643 | A | * | 9/1997  | Matuyama ............. 324/207.12 |
| 5,677,686 | A | * | 10/1997 | Kachi et al. ..................... 341/8 |
| 5,746,005 | A |   | 5/1998  | Steinberg |
| 5,808,462 | A | * | 9/1998  | Fujii et al. ............... 324/76.13 |

OTHER PUBLICATIONS

By D.E. Yount, E.W. Gillary and D.C. Hoffman; Entitled: A Microscopic Investigation of Bubble Formation Nuclei; Department of Physics and Astronomy, and Department of Physiology, University of Hawaii, Honolulu Hawaii. vol. 76, No. 5, Nov. 1984. p. 1511; 1519 and p. 2-9.

* cited by examiner

*Primary Examiner*—Jeffrey R. West
*Assistant Examiner*—Phuong Huynh
(74) *Attorney, Agent, or Firm*—Michael E. Belk

(57) ABSTRACT

A position determining system for determining a position of a rotor of a rotating motor has sensors that are coupled to the rotor. The sensors generate, in response to a rotation of the rotor, a quadrature signal that has sine and cosine components. The position determining system calculates a sum ($A^2$) of a squared value of the sine component ($A^2\sin^2 x$) and a squared value of the cosine component ($A^2\cos^2 x$). An amplitude correction factor (A) is calculated as the squared root of the sum ($A^2$). An amplitude corrected sine component (sin (x)) is obtained by dividing the sine component (Asin(x)) by the amplitude correction factor (A). An amplitude corrected cosine component (cos(x)) is obtained by dividing the cosine component (Acos(x)) by the amplitude correction factor (A).

3 Claims, 6 Drawing Sheets

POSITION DETERMINING

The invention relates to a position determining system for determining a position of a rotor of a rotating motor, a position determining method, and an optical or magnetic drive comprising such a position determining system.

U.S. Pat. No. 5,677,686 discloses an absolute position detection apparatus which comprises sine and cosine wave generators for generating one or more sets of sine and cosine waves within a cycle. An analog to digital converters converts the incoming sine and cosine waves generated by the sine and cosine wave generators into digital values. An arithmetic unit calculates a compensation for offset, amplitude and phase errors on the basis of the digital values from the analog to digital converters. The digital values supplied by the analog to digital converters include offset errors, a too large or too small amplitude, and a shift, between the two phases. U.S. Pat. No. 5,677,686 discloses a static and dynamic compensation of these errors.

In the sixth embodiment of this prior art, from the offset compensated data sin(AOF) and cos(AOF) the squared value $R=\sin^2(AOF)+\cos^2(AOF)$ is determined. This data is sampled during operation to provide a maximum value or an average value of a given sampling count. The squared value at 90° is compared with the squared value at 270° and the offset compensation value is changed according to a difference between these squared values. For example, if the squared value at 90° has a smaller value than the squared value at 270°, the offset compensation value is increased until these squared values are equal.

In the seventh embodiment of this prior art, an amplitude compensation is disclosed which uses the squared values. The amplitude compensation value is the square root of a reference value divided by the equal squared values. The fourth embodiment of this prior art discloses that the sine and cosine are amplitude compensated by multiplying the original sine and cosine with a reference amplitude divided by the amplitude compensation value. Thus, the sine and cosine are amplitude compensated by multiplying the original sine and cosine with the square root of the squared value.

A drawback of the prior art is that the amplitude offset compensation drifts away when the motor is not rotating.

It is an object of the invention to provide a position determining system which is able to perform amplitude offset compensation even when the motor is not rotating.

A first aspect of the invention provides a position determining system for determining a position of a rotor of a rotating motor, said system comprises sensing means coupled to the rotor for generating in response to a rotation of the rotor a quadrature signal comprising a sine component and a cosine component, and calculating means for calculating (i) a sum of a squared value of the sine component and a squared value of the cosine component, (ii) an amplitude correction factor as the squared root of the sum, and (iii) an amplitude corrected sine component as the sine component divided by the amplitude correction factor and an amplitude corrected cosine component as the cosine component divided by the amplitude correction factor.

A second aspect of the invention provides a position determining method for determining a position of a rotor of a rotating motor, said method comprising generating in response to a rotation of the rotor a quadrature signal comprising a sine component and a cosine component, and calculating (i) a sum of a squared value of the sine component and a squared value of the cosine component, (ii) an amplitude correction factor as the squared root of the sum, and (iii) an amplitude corrected sine component as the sine component divided by the amplitude correction factor and an amplitude corrected cosine component as the cosine component divided by the amplitude correction factor.

A third aspect of the invention provides an optical or magnetic drive comprising a pick-up unit for reading and/or writing information from/to an optical or magnetic medium, a rotating motor with rotor, a gearbox for converting a rotating movement of the rotor into a linear movement of optical pick-up unit, and a position determining system for determining a position of the rotor, said system comprising sensing means coupled to the rotor for generating in response to a rotation of the rotor a quadrature signal comprising a sine component and a cosine component, and calculating means for calculating (i) a sum of a squared value of the sine component and a squared value of the cosine component, (ii) an amplitude correction factor as the squared root of the sum, and (iii) an amplitude corrected sine component as the sine component divided by the amplitude correction factor and an amplitude corrected cosine component as the cosine component divided by the amplitude correction factor.

The position determining system in accordance with the first aspect of the invention determines a position of a rotor of a rotating motor. The position determining system generates, in response to a rotation of the rotor, a quadrature signal which comprises a sine component and a cosine component, in the same manner as in the prior art. As long as the motor is rotating, the sine and cosine components are sine wave shaped signals. When the motor is not rotating the sine and cosine components are DC levels. The position determining system calculates an amplitude correction factor as the squared root of the sum of a squared value of the sine component and a squared value of the cosine component. The amplitude corrected sine component is the sine component divided by the amplitude correction factor, and the amplitude corrected cosine component is the cosine component divided by the amplitude correction factor.

Thus for each set of values of the sine component and the cosine component the squared root is determined. The amplitude corrected sine and cosine components are obtained by dividing the sine and cosine components by the squared root. Consequently, the amplitude correction is also operative if the motor does not rotate. In contrast, the prior art amplitude compensation has to determine minimum and maximum values to be able to perform the amplitude compensation. This is only possible as long as the motor is rotating. If the motor is not rotating, the sine and cosine components are DC levels which do not have different maximum and a minimum values. Therefore, the prior art is unable to compensate for drift of the DC-levels. This has the disadvantage that during periods in time the motor is not rotating, the position information is drifting away which will take extra time to catch the correct position when the motor starts rotating.

The amplitude correction in accordance with the invention is based on the insight that at every phase of the quadrature signal holds:

$A^2 \sin^2(x) + A^2 \cos^2(x) = A^2$ wherein $A$ is the amplitude.

Thus, at every phase of the rotor, the dynamic amplitude $A$ is determined. The amplitude corrected sine and cosine components are obtained by dividing the original sine and cosine components by this dynamic amplitude.

A further advantage of the amplitude correction in accordance with the invention is that it is instantaneous, while in the prior art cited, the compensation value is iteratively increased until these squared values are equal.

It has to be noted that in the amplitude correction in accordance with the invention the original sine and cosine components are divided by a factor proportional with the squared root of the sum of the squared values, while in the prior art cited this division is a multiplication.

In one embodiment, the position is determined by calculating: the inverse sine (by applying the arcsine function) of the amplitude corrected sine component to obtain the amplitude of the sine component, the inverse cosine (by applying the arccosine function) of the amplitude corrected cosine component to obtain the amplitude of the cosine component, and summing these two amplitude values.

In another embodiment, before the sum is calculated, first, the amplitudes of the cosine and sine component are weighted. The weighting factors or functions are selected to favor the cosine and sine component around their zero crossings. Thus, the weighting factor for the cosine or sine component has value around the zero crossings of the cosine or sine component which is larger than its value around the peaks of the cosine or sine component. For example, the weighting function is $1-\cos^2 x$ or $1-\sin^2 x$ for the cosine or sine component, respectively. This weighting has the advantage that the parts of the cosine or sine component where the sensitivity to the position variation is largest are favored. Thus, the weighting function suppresses the peaks of the cosine and sine component which are less sensitive to the position variation and do not suppress the steep slopes around the zero crossings.

These and other aspects of the invention are apparent from and will be elucidated with reference to the embodiments described hereinafter.

In the drawings:

FIG. 1 shows a mechanism which converts a rotating movement into a linear movement and which comprises sensors for supplying position information, FIG. 2 shows a block diagram of a position determining system which determines a position indication from the position information, FIG. 3 shows statically corrected position information sine and cosine signals, FIG. 4 shows squared statically corrected position information signals, FIG. 5 shows the dynamic gain correction factor obtained by summing the squared statically corrected position information signals, FIG. 6 shows the dynamically normalized sine and cosine signals, FIG. 7 shows the weighted phases of the sine and cosine signals, FIG. 8 shows the phase derived from the weighted phases, and FIG. 9 shows the extended phase which is the position indication indicative for the position of the motor or the element which is linearly moved.

FIG. 1 shows a mechanism which converts a rotating movement into a linear movement and which comprises sensors for supplying position information. The motor M has a rotor which rotates the shaft AX when the motor is energized. The rotor is inside the motor housing and thus is not shown. Usually, in an optical drive, the shaft AX is connected to a gearbox which decreases the rotating speed of the rotor to a desired rotating speed of an outgoing axis. The gearbox may further comprise a construction for converting the rotating speed of the outgoing axis to a linear movement of an optical pickup unit. In FIG. 1, a simplified gearbox is shown. This gearbox comprises a disc shaped member DM attached to the shaft AX. A side wall of the disc shaped member DM is pushed against a rod shaped element which is or is part of the optical unit OPU. The practical implementation of the gearbox is not relevant to the invention and may have any suitable construction which is able to convert the rotating movement of the shaft AX connected to the rotor into a linear movement of the optical unit OPU. Although is referred to the optical unit which is used in an optical disc drive to cooperate which an optical disc, this unit may also be a magnetical unit cooperating with a magnetical storage medium.

A magnetized ring MR is attached to the shaft AX to be able to determine the position of the shaft AX and thus the position of the unit OPU. Usually, this ring MR is periodically magnetized, for example, nine magnetic pole pairs may be present. Two Hall sensors HS1 and HS2 are arranged with respect to the magnetized ring MR to sense its flux. When the shaft AX of the rotor is rotating, the magnetic ring MR rotates and the Hall elements HS1 and HS2 sense the varying magnetic field which results in the sinusoidal signals VH1 and VH2, respectively. By positioning the Hall sensors HS1, HS2 under a 90° angle, the phase difference of the two signals VH1 and VH2 is 90° and a quadrature signal QS (see FIG. 2) is obtained which comprises a sine and a cosine component. The signal VH1 is the sine component and the signal VH2 is the cosine component. The position determining system shown in FIG. 2 converts this quadrature signal QS into a phase signal x,SU indicating a rotational position of the shaft AX or a linear position of the unit OPU. The phase signal x,SU is also referred to as the position signal or the position.

Instead of the Hall sensors HS1, HS2, the varying magnetic field may be sensed by other sensors which are sensitive to a magnetic field. It is also possible to sense the position by using a varying electrical field or a varying amount of light. The invention is relevant to determine a position in a system wherein a quadrature signal QS is representative for a rotating movement.

A main problem in converting the quadrature signal QS into a position signal x,SU is that, usually, the sine component VH1 and the cosine component VH2 have amplitude errors and DC-offset errors. For example, the signals VH1 and VH2 supplied by the Hall sensors HS1 and HS2 may be dependent on the temperature, the distance between the magnetized ring MR and the Hall sensors HS1 and HS2 and the strength of the magnetic field of the magnetized areas of the ring MR. As known, the signals VH1 and VH2 can be corrected for static errors. The corrected signals are indicated by VHC1 and VHC2 in FIG. 2. The corrected signals VHC1 and VHC2 are statically corrected for the average DC-offset and the average amplitude. Usually, this static correction is the only signal conditioning applied to the signal before it enters the conventional quadrature decoding algorithm. The rotation dependent variations of the signal are not cancelled. The position determining system and method in accordance with the invention provides a more advanced pre-conditioning of the signals VH1 and VH2 and, consequently, a more accurate and robust position signal x,SU results.

FIG. 2 shows a block diagram of a position determining system which determines a position indication x,SU from the position information. The static compensation circuit 1 receives the quadrature signal QS which comprises the sine component VH1 which is $A2\sin(x-\phi/2)$ and the cosine component VH2 which is $A1\cos(x+\phi/2)$ from the Hall sensors HS1 and HS2, respectively. The static compensation circuit 1 supplies the statically corrected position information VHC1 which is $A\sin(x)$ and VHC2 which is $A\cos(x)$. An example of these signals VHC1 and VHC2 is shown in FIG. 3. In the embodiment shown in FIG. 2, the signals VHC1 and VHC2 are 8 bit digital words as indicated by the 8 at the respective lines.

The blocks, in which a function is shown, perform these functions on their respective input signals to obtain the respective output signals. The blocks may represent hardware circuits or steps performed by a processing circuit such as a microcomputer.

The block 2 receives the signal VHC2=Acos(x) as the input signal and supplies the squared input signal $A^2\cos^2 x$ as the output signal. The block 3 receives the signal VHC1=Asin(x) as the input signal and supplies the squared input signal $A^2\sin^2 x$ as the output signal. The squared signals $A^2\cos^2 x$ and $A^2\sin^2 x$ of the blocks 2 and 3 are shown in FIG. 4 for the signals VHC1 and VHC2 shown by way of example in FIG. 3. The block 4 sums the output signals $A^2\cos^2 x$ and $A^2\sin^2 x$ of the blocks 2 and 3 to obtain the dynamic gain correction value $A^2$ which is representative for the actual amplitude A at each phase x of the quadrature signal QS. In the static gain calibration performed in the static compensation circuit 1, care is taken that the amplitude A of the statically corrected sine component VHC1 and the statically corrected cosine component VHC2 are identical. The gain correction value $A^2$ is shown in FIG. 5 for the signals VHC1 and VHC2 shown by way of example in FIG. 3.

The block 5 calculates the inverse of the square root of the value $A^2$ to obtain a correction factor 1/A. The multiplier 6 multiplies the signal VHC2 with the correction factor 1/A to obtain the dynamically normalized signal cos(x). The multiplier 7 multiplies the signal VHC1 with the correction factor 1/A to obtain the dynamically normalized signal sin(x). The normalized signals sin(x) and cos(x) are shown in FIG. 6 for the signals VHC1 and VHC2 shown by way of example in FIG. 3. These normalized signals sin(x) and cos(x) need not have unity peak amplitude, they may have any desired fixed peak amplitude.

The actual amplitude of the signals cos(x) and sin(x) can now be converted into the corresponding phase x,SU. First, the sin(x) signal is converted into the value x,IS with the arcsin(x) function of block 11 which calculates the value x,IS as arcsin(sin(x)). And the cos(x) signal is converted into the value x,IC with the arccos(x) function of block 10 which calculates the value x,IC as arccos(cosx). The converted values x,IS and x,IC are summed in the block 16 to obtain the phase x,SU.

However, in an improved embodiment, the blocks 9 and 14 are added to weight the cos(x) signal, and the blocks 10 and 15 are added to weight the sin(x) signal. The weighting is based on the recognition that the sensitivity to a position variation is largest around the zero crossings of the signals and lowest around the peaks of the signals. Therefore, the weighting functions are selected to favor the signals around their zero crossings. The block 9 calculates the value $1-\cos^2(x)$ which is multiplied with the signal x,IC in the multiplier 14 to obtain the signal $x(1-\cos^2(x))$. The block 10 calculates the value $1-\sin^2(x)$ which is multiplied with the signal x,IS in the multiplier 15 to obtain the signal $x(1-\sin^2(x))$. The signals $(1-\cos^2(x))\arccos(\cos(x))$ and $(1-\sin^2(x))\arcsin(\sin(x))$ are shown in FIG. 7 for the signals VHC1 and VHC2 shown by way of example in FIG. 3.

The block 16 adds these signals to obtain $x-x\cos^2(x)+x-x\sin^2(x)=2x-x=x$ indicated by x,SU (see FIG. 8) to make clear that this is the phase signal at the output of the position determining system or method.

The multipliers 12 and 13 are used to correct for a $2\pi$ wrap around as will be elucidated with respect to FIGS. 8 and 9. The multiplier 12 receives the 8 bit signal x,IC and a sign bit SB1 to supply an output signal to the multiplier 14. The multiplier 13 receives the 8 bit signal x,IS and a sign bit SB2 to supply an output signal to the multiplier 15.

Figure 3:
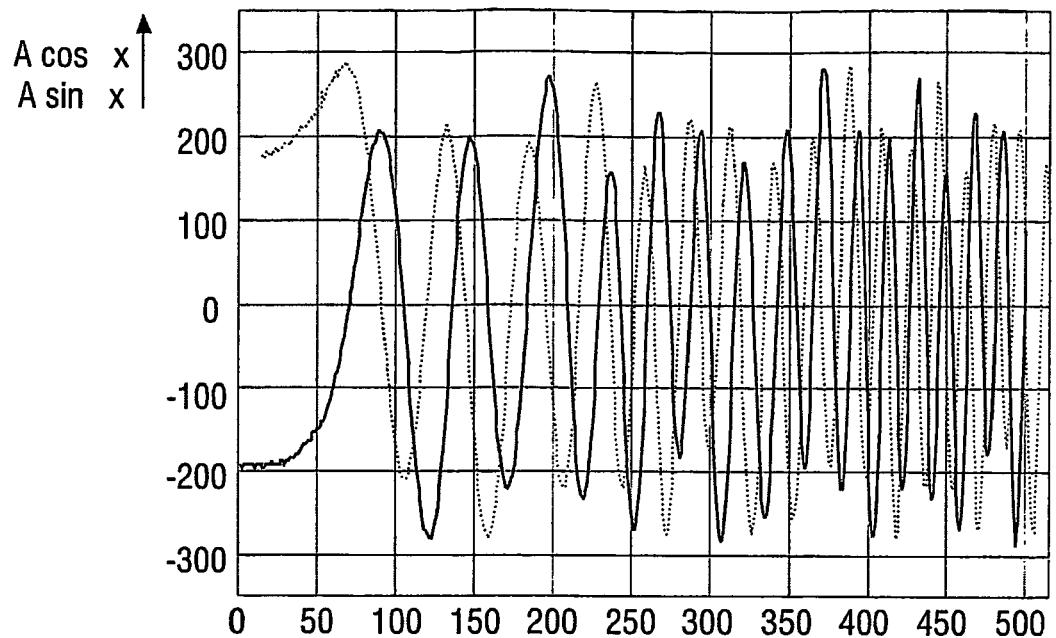
FIG. 3 shows statically corrected position information sine and cosine signals. The statically corrected position information VHC1 represents the sine signal Asin(x), the statically corrected position information VHC2 represents the cosine signal Acos(x).
Figure 4:
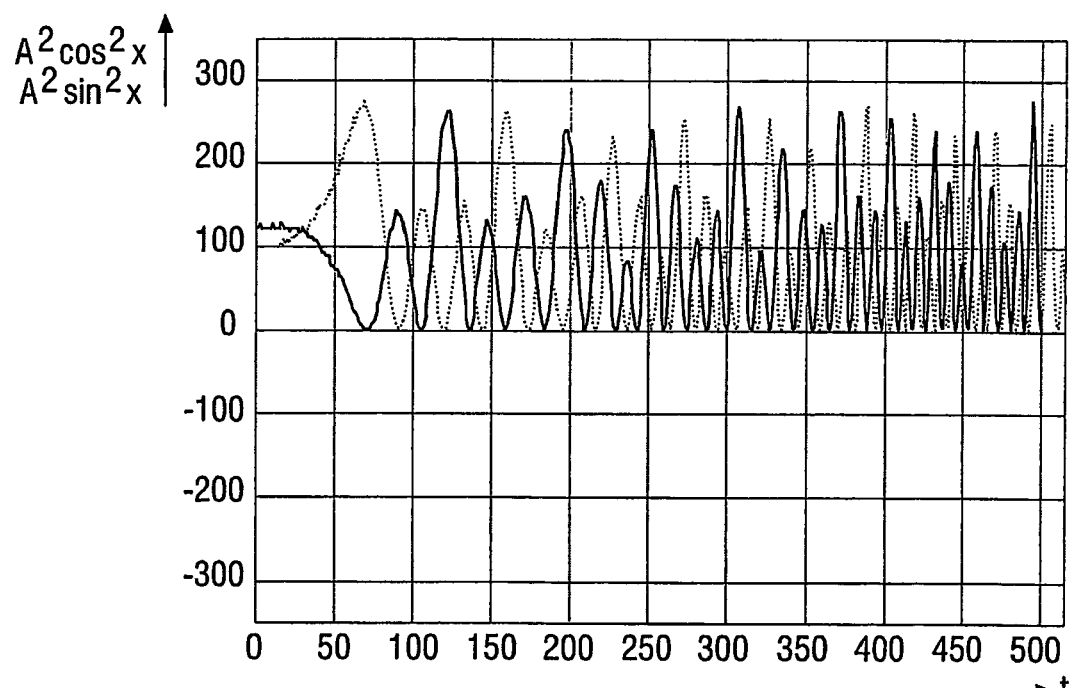
FIG. 4 shows the squared statically corrected position information signals $A^2\cos^2 x$ and $A^2\sin^2 x$.
Figure 5:
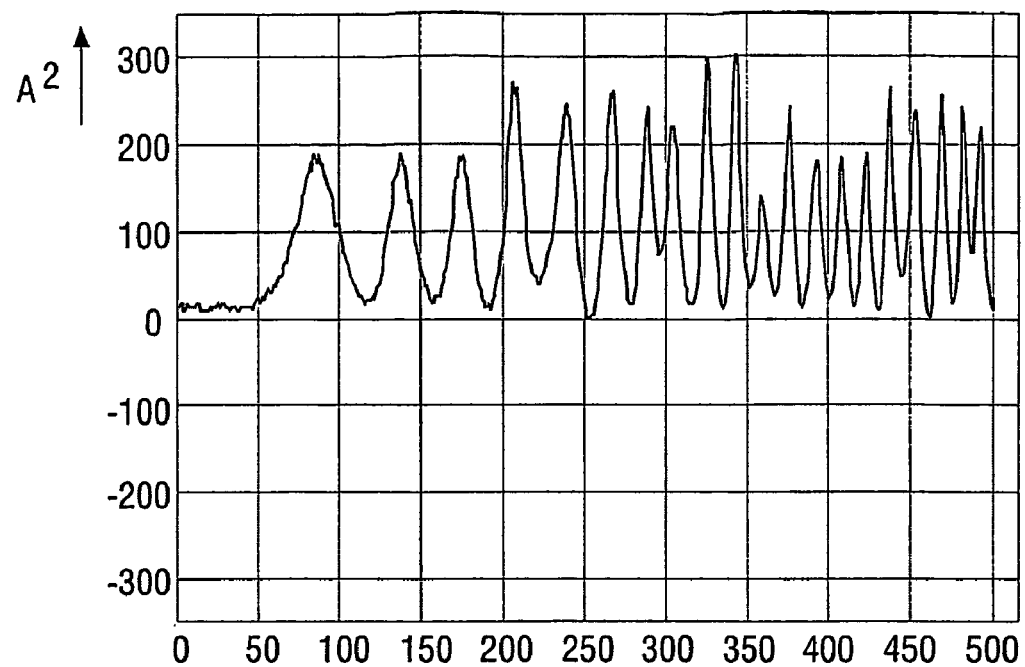
FIG. 5 shows the dynamic gain correction factor $A^2$ obtained by summing the squared statically corrected position information signals.
Figure 6:
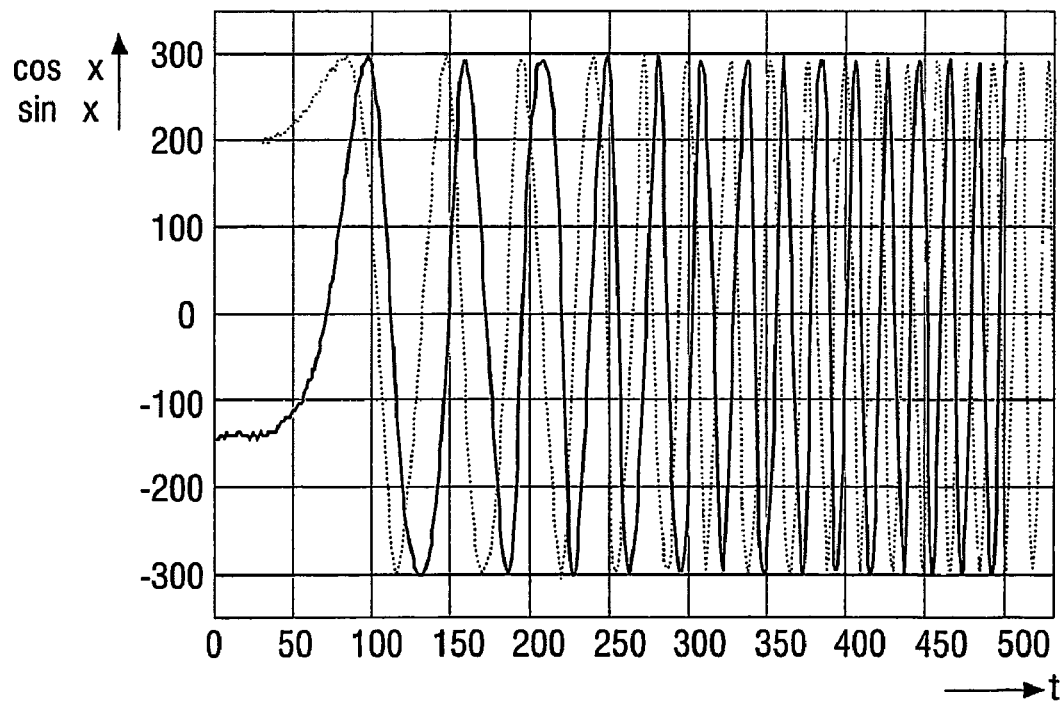

FIG. 6 shows the dynamically normalized sine signal sin(x) and cosine signal cos(x). As is clear from FIG. 6 the Asin(x) signal and the Acos(x) signal shown in FIG. 3 are now divided by the factor A for every phase. The resultant signals sin(x) and cos(x) have the desired normalized amplitude. If these resultant signals are processed by an inverse sine function arcsin(x) and an inverse cosine function arccos(x) the corresponding phases are retrieved. The sum of these retrieved phases is the phase of the quadrature signal and thus represents the position of the shaft AX or the rotor of the motor M.

Figure 7:
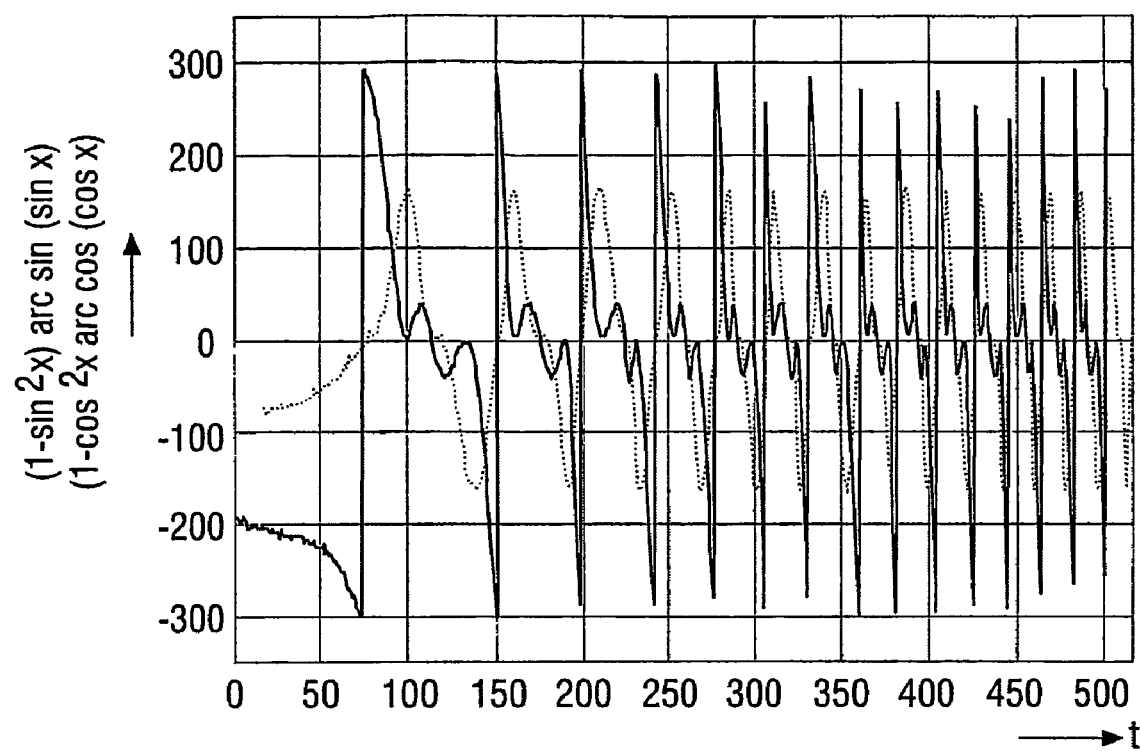

FIG. 7 shows the weighted phases of the sine and cosine signals. The weighting of the signals sin(x) and cos(x) has the effect that the parts of these signals around their zero crossings are more decisive than the parts around their peak values. This has the advantage that the parts which are most sensitive to position variations have the largest influence.

Figure 8:
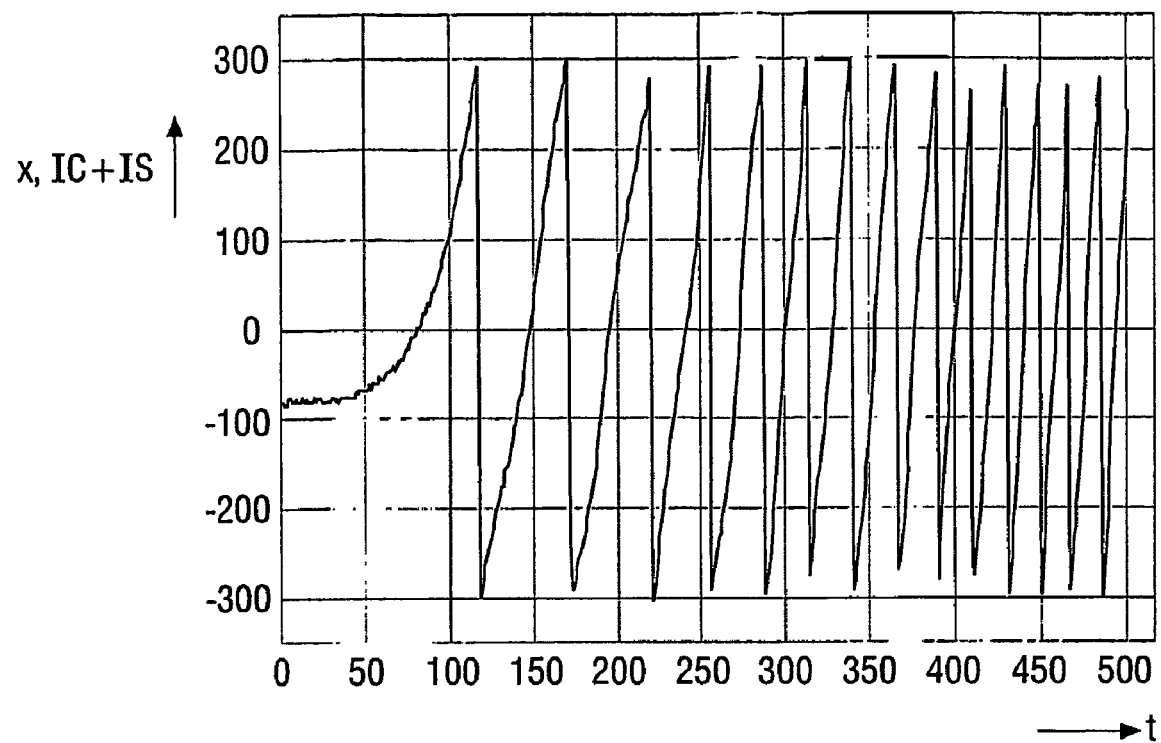

FIG. 8 shows the phase x,SU derived from the weighted phases if the multipliers 12 and 13 are not present. Two peaks with the same polarity indicate a phase change of $2\pi$. By detecting the $2\pi$ wrap-around, the phase characteristic can be extended by subtracting $2\pi$ at the wrap-around points to obtain the smooth position signal shown in FIG. 9. The sign reversal is obtained by the sign bits SB1 and SB2 supplied to the multipliers 12 and 13, respectively.

Figure 9:
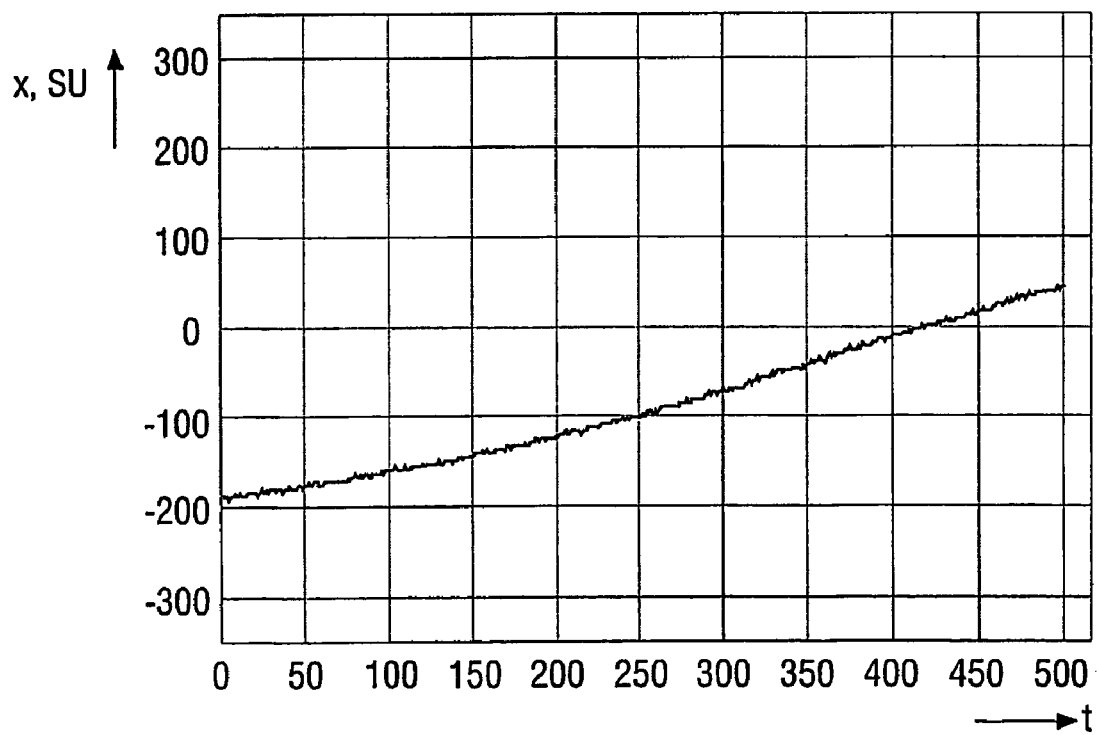

FIG. 9 shows the extended phase x,SU when the multipliers 12 and 13 are present. This extended phase x,SU is the position indication indicative for the rotational position of the shaft AX or the linear position of the element OPU which is linearly moved.

It should be noted that the above-mentioned embodiments illustrate rather than limit the invention, and that those skilled in the art will be able to design many alternative embodiments without departing from the scope of the appended claims.

Figure 1:
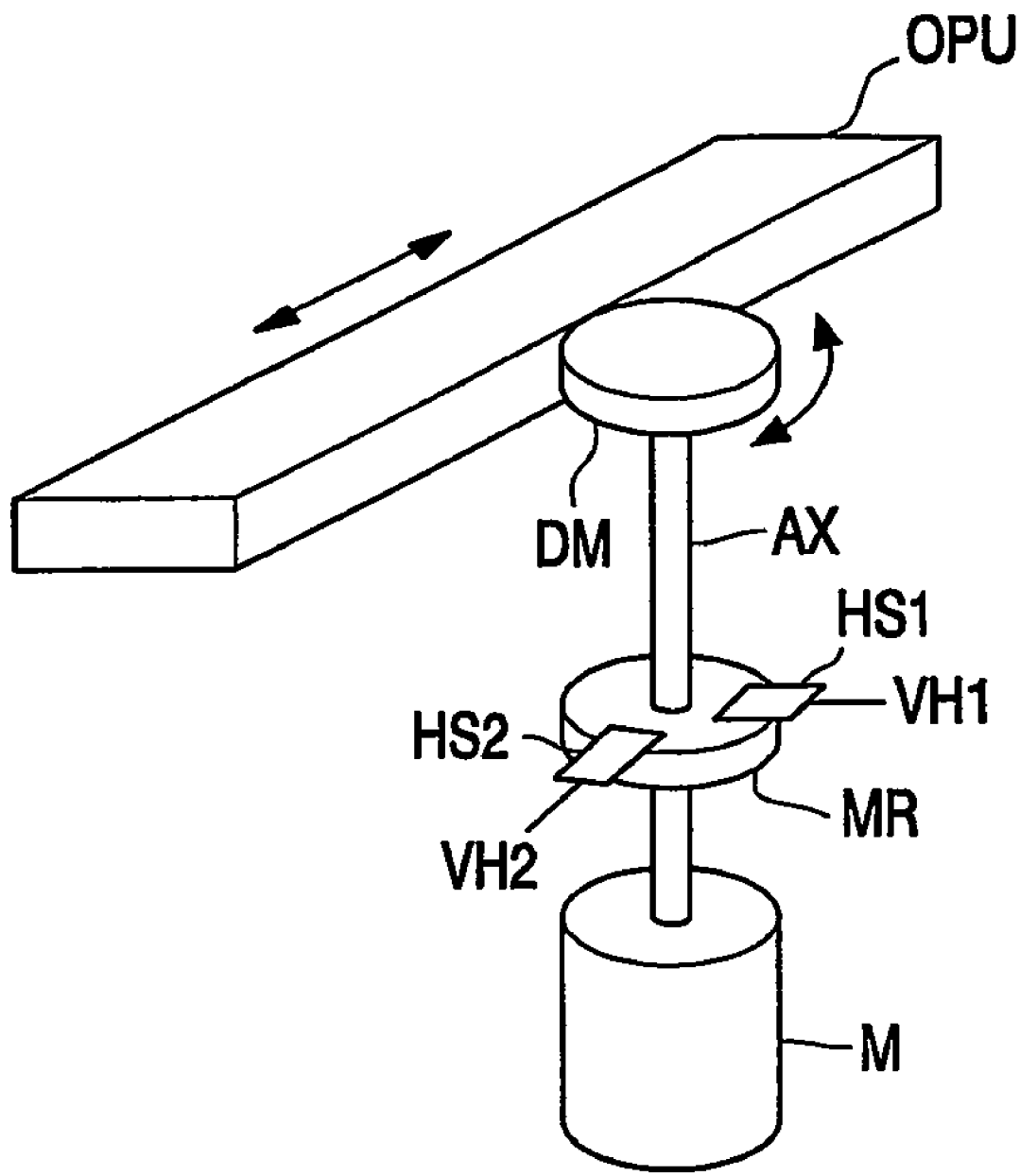
Figure 2:
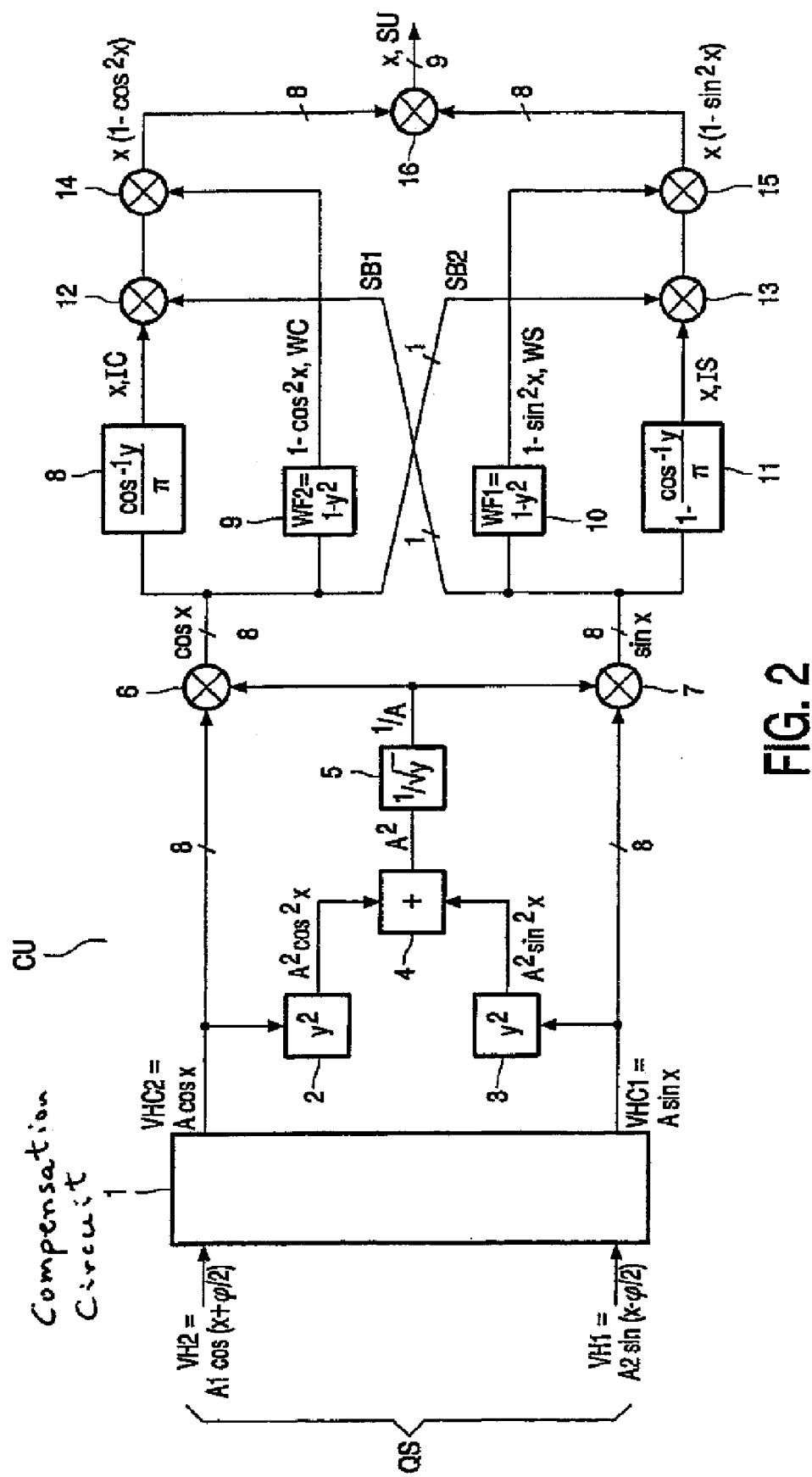

For example, the circuit shown in FIG. 2 may comprise dedicated hardware circuits performing the actions or operations described. Preferably, the signals VH1, VH2 supplied by the Hall sensors HS1, HS2 are digitized by analog the digital converters to enable digital signal processing. The number of bits of the digital words representing the signals mentioned may be selected to obtain a desired accuracy. The algorithm may also be performed by a suitably programmed computer or digital processor unit. Although preferably the operations are performed in the digital domain it is as well possible to perform the operations in the analog domain.

The extended phase x,SU which is the position indication may be used in a control loop which further receives a set point. The difference between the set point and the position indication is used to generate a control signal for the motor.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A position determining system for determining a position of a rotor of a rotating motor, said system comprising:
sensing means coupled to the rotor for generating in response to a rotation of the rotor a quadrature signal comprising a sine component and a cosine component, and
calculating means for calculating
a sum ($A^2$) of a squared value of the sine component ($A^2\sin^2 x$) and a squared value of the cosine component ($A^2\cos^2 x$),
an amplitude correction factor (A) as a squared root of the sum ($A^2$),
an amplitude corrected sine component (sin(x)) as the sine component (Asin(x)) divided by the amplitude correction factor (A) and an amplitude corrected cosine component (cos(x)) as the cosine component (Acos(x)) divided by the amplitude correction factor (A),
weighting an inverse sine value of the amplitude corrected sine component (sin(x)) with a weighting factor for favoring the inverse sine value around its zero crossings to obtain a weighted sine value,
weighting an inverse cosine value of the amplitude corrected cosine component (cos(x)) with a weighting factor for favoring the inverse cosine value around its zero crossings, to obtain a weighted cosine value, and
an output sum of the weighted inverse sine value of the amplitude corrected sine component (sin(x)) and the weighted inverse cosine value of the amplitude corrected cosine component (cos(x)), and
output means for outputting the output sum for determining the position of the rotor.

2. A position determining method for determining a position of a rotor of a rotating motor, said method comprising:
generating in response to a rotation of the rotor a quadrature signal comprising a sine component and a cosine component,
calculating
a sum ($A^2$) of a squared value of the sine component ($A^2\sin^2 x$) and a squared value of the cosine component ($A^2\cos^2 x$),
an amplitude correction factor (A) as a squared root of the sum ($A^2$), and
an amplitude corrected sine component (sin(x)) as the sine component (Asin(x)) divided by the amplitude correction factor (A) and an amplitude corrected cosine component (cos(x)) as the cosine component (Acos(x)) divided by the amplitude correction factor (A),
weighting an inverse sine value of the amplitude corrected sine component (sin(x)) with a weighting factor for favoring the inverse sine value around its zero crossings to obtain a weighted sine value,
weighting an inverse cosine value of the amplitude corrected cosine component (cos(x)) with a weighting factor for favoring the inverse cosine value around its zero crossings, to obtain a weighted cosine value, and
an output sum of the weighted inverse sine value and the weighted inverse cosine value of the amplitude corrected cosine component (cos (x)), and
outputting the output sum for determining the position of the rotor.

3. An optical or magnetic drive comprising
a pick-up unit for reading and/or writing information from/to an optical or magnetic medium,
a rotating motor having a rotor,
a gearbox for converting a rotating movement of the rotor into a linear movement of optical pick-up unit), and
a position determining system for determining a position of the rotor, said system comprising
sensing means coupled to the rotor for generating in response to a rotation of the rotor a quadrature signal comprising a sine component and a cosine component,
calculating means for calculating
a sum ($A^2$) of a squared value of the sine component ($A^2\sin^2 x$) and a squared value of the cosine component ($A^2\cos^2 x$),
an amplitude correction factor (A) as a squared root of the sum ($A^2$), and
an amplitude corrected sine component (sin(x)) as the sine component (Asin(x)) divided by the amplitude correction factor (A) and an amplitude corrected cosine component (cos(x)) as the cosine component (Acos(x)) divided by the amplitude correction factor (A),
weighting an inverse sine value of the amplitude corrected sine component (sin(x)) with a weighting factor for favoring the inverse sine value around its zero crossings to obtain a weighted sine value,
weighting an inverse cosine value of the amplitude corrected cosine component (cos(x)) with a weighting factor for favoring the inverse cosine value around its zero crossings, to obtain a weighted cosine value, and
an output sum of the weighted inverse sine value of the amplitude corrected sine component (sin(x)) and the weighted inverse cosine value of the amplitude corrected cosine component (cos(x)), and
output means for outputting the output sum for determining the position of the rotor.

* * * * *